United States Patent [19]

Hedén

[11] Patent Number: 4,660,321

[45] Date of Patent: Apr. 28, 1987

[54] CLIMATE CONTROL IN BUILDING STRUCTURES

[76] Inventor: Carl-Göran Hedén, Solna Kyrkväg 11, 109 01 Stockholm, Sweden

[21] Appl. No.: 242,386

[22] Filed: Mar. 10, 1981

[30] Foreign Application Priority Data

Mar. 11, 1980 [SE] Sweden .............................. 8001899

[51] Int. Cl.$^4$ .............................................. A01G 9/00
[52] U.S. Cl. ...................................................... 47/17
[58] Field of Search ............................. 47/59, 65, 17, 1

[56] References Cited

U.S. PATENT DOCUMENTS

| | | |
|---|---|---|
| 3,918,512 | 11/1975 | Kuneman . |
| 4,003,160 | 1/1977 | Muller ................ 47/17 X |
| 4,233,958 | 11/1980 | Heden ................ 47/17 X |

FOREIGN PATENT DOCUMENTS

| | | | |
|---|---|---|---|
| 2705312 | 8/1978 | Fed. Rep. of Germany . | |
| 2735288 | 2/1979 | Fed. Rep. of Germany | .......... 47/17 |
| 77079432 | 7/1977 | Sweden . | |
| 78121167 | 11/1978 | Sweden . | |
| 1031309 | 6/1966 | United Kingdom | ...................... 47/1 |
| 1038320 | 8/1966 | United Kingdom | ...................... 47/1 |
| 1484773 | 9/1977 | United Kingdom | .................... 47/65 |

*Primary Examiner*—Robert E. Bagwill
*Attorney, Agent, or Firm*—Young & Thompson

[57] ABSTRACT

To improve heat economy in certain building structures, e.g. greenhouses and sports halls, a plastic film is applied which is held in place by evacuating the space between the structure and the plastic film. Periodic excess heat is accumulated in a heat storage chamber, which can also be combined with a composting chamber.

The building structure is preferably made in the shape of a geodesic dome. Greenhouses of this type can be placed with advantage on pontoons or barges.

4 Claims, No Drawings

CLIMATE CONTROL IN BUILDING STRUCTURES

The present invention relates to land- and water-based structures with climate control and high utilization of heat energy supplied.

Heat economy in the Scandinavian climate requires much attention and overheating of thin-walled structures, such a greenhouses, storehouses, sports halls etc. should not be prevented by airing out, but by heat storage. In greenhouses, the advantage is also obtained that the carbon dioxide generated by microbiological activity in the soil can benefit the plants. A geodesic dome placed on top of the heat storage chamber provides a geometry which facilitates the natural air circulation and improves the effectiveness of the construction.

The advantageous characteristics of the hemispherical shape in structures have been used previously by the inventor in his earlier inventions, for example according to Swedish Patent Application No. 7510193-4, in which solar energy is collected in a hemispherical dome and is stored in a heat foundation which encloses a composting chamber for anaerobic methane fermentation. A hemispherical construction was also used in the climate controlled structure according to Swedish Patent Application No. 7707943-2, in which a hemispherical dome is combined with reflectors, screens and controlled air circulation.

The present invention can be viewed as a further development of the earlier inventions, taking into account their advantages, for example the maximum absorption of incoming radiant energy, the ideal air circulation with upwardly rising air along the walls and downward flowing air in the center. It has now been discovered that the energy used is significantly improved if the heat insulation on the outside is supplemented with an extra insulation. This is achieved according to the invention by the enclosed volume being delimited by a transparent plastic jacket held fast by suction by underpressure. This extra plastic layer is most suitably arranged on the inside of the structure and will thus be held fast by suction against the supporting structural members. The method according to the invention can of course also be used for other structures, for example old greenhouses in which a number of the glass panes are broken or where there are large gaps. In this case it is suitable to arrange one plastic layer on the inside and one on the outside, thus achieving a complete seal when the space between the plastic layers is evacuated. There are a number of different advantages with this procedure. The extra plastic layer provides both additional insulation due to its thickness and reduced convection due to the lower pressure in the intermediate space. Furthermore condensation is prevented by allowing a small amount of dry air to leak in. Thus the structural members are protected effectively, in wood constructions against rot and in iron or steel constructions against rust. The plastic layers are locked by the underpressure against the supporting construction so that no wear occurs by rubbing or the like.

Different materials can be selected for the plastic film, and polyethylene film has proved to be best suited to the purpose and the least expensive. A thickness of 0.05-0.5 mm has been proved to be most suitable for the stresses involved. Colouring or surface treatment to make the film diffusing, can give the plastic various characteristics as regards light-permeability. In sports halls or storage facilities, for example, it can be advisable to screen off a portion of the light which is uncomfortable to the eyes, semitransparent, gray or coloured plastic can be used here.

For greenhouses placed on land, heat storage can be accomplished by conducting the central, downwardly flowing air into a heat storage chamber beneath the greenhouse, from which heat can be returned during colder periods. The heat storage chamber suitably consists of a stone foundation which can be combined with a composting chamber.

In greenhouses placed on water, there are a number of special considerations. The placement of greenhouses on water, for example lakes or bays, has many advantages, there being no land costs, natural isolation being provided from surrounding land reducing problems with pests and the like, water is available for watering, additional energy can be easily extracted from the surrounding water with a heat pump, etc. In extreme cases, cooling water for cooling is also easily available, even if such extreme requirements as cooling must be considered to be exceptional, at least in Scandinavia.

When placing a greenhouse on water, it is quite simply placed on a barge or a pontoon which encloses a water chamber for heat accumulation which is insulated from the surroundings. A composting chamber can be arranged in a container submerged in the warm water. A number of pontoons or barges can be connected to each other to form larger cultivation units and a simple, easily operated coupling device for the barges and pontoons is also included in the invention. Since very large amounts of materials are transported to and from the greenhouses (soil, fertilizer, harvested vegetables, etc.) certain pontoons must be able to be easily detached from a larger complex and be moved to a dock for loading or unloading. For this purpose a suction cup is used consisting of an annular rubber tube, a large vehicle inner tube, for example. Such tubes filled with air or water are mounted on the sides and ends of the pontoons or barges. If such a tube is placed as a fender between two pontoons and the air is evacuated from the space encompassed by the tube, a very strong and at the same time elastic connection is achieved between pontoons or barges. For evacuation, the same pumps can be used as are used for evacuation of the space between the greenhouse wall and the plastic film. To release such a coupling, it is sufficient to shut off the evacuation and possibly let in air through a pet cock. The same coupling can also be used when the pontoons or barges dock for loading or unloading.

I claim:

1. Water based greenhouse consisting of one or more units, with each unit in the form of a geodesic dome, characterized in that it is arranged on a pontoon or barge, and with a heat storage chamber for accumulating excess heat, consisting of insulated ballast water in the pontoon or barge, and that a plastic film is arranged against the wall of the dome, held in place by underpressure in the intermediate space, to improve heat insulation.

2. Greenhouse according to claim 1, characterized in that the plastic film is arranged on the inside of the dome.

3. Greenhouse according to claim 1, characterized in that a composting chamber, preferably for organic waste from the cultivation in the greenhouse, is arranged in the form of a container submerged in the ballast water in the pontoon or barge.

4. Greenhouse according to any one of the preceding claims, characterized in that several units can be coupled together into a larger complex with coupling means consisting of elastic chambers which can be evacuated.

* * * * *